June 3, 1958 D. E. THOMSON ET AL 2,836,913
ADVERTISING SIGN STRUCTURE FOR MOUNTING ON VEHICLES
Filed June 21, 1955
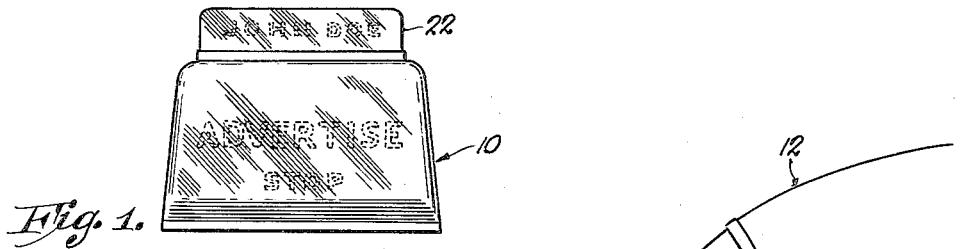
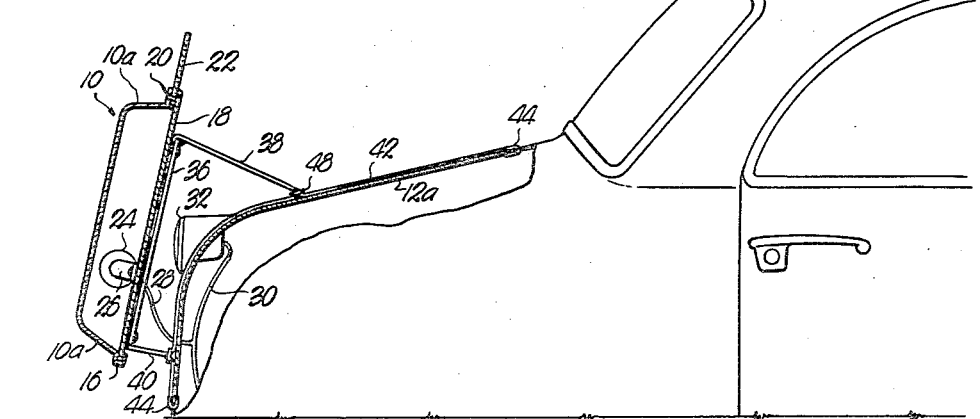
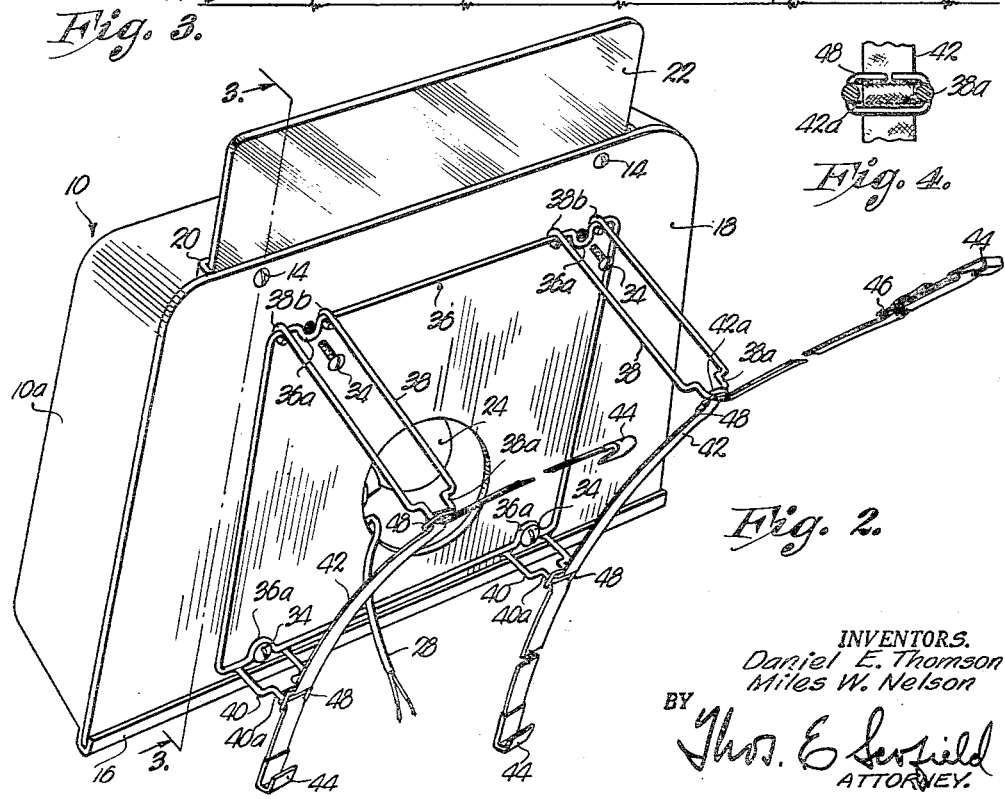
INVENTORS.
Daniel E. Thomson
Miles W. Nelson
BY
Thos. E. Scofield
ATTORNEY.

United States Patent Office 2,836,913
Patented June 3, 1958

2,836,913

ADVERTISING SIGN STRUCTURE FOR MOUNTING ON VEHICLES

Daniel E. Thomson, Grandview, and Miles W. Nelson, Kansas City, Mo.

Application June 21, 1955, Serial No. 516,844

3 Claims. (Cl. 40—129)

This invention relates to advertising signs of the type adapted to be secured to moving vehicles such as automobiles and refers more particularly to an improved sign of this character which is readily mounted on and demounted from vehicles of varying types and models, and which is particularly useful at night.

Signs on the rear of commercial vehicles such as taxicabs are not new. They have been used for a number of years and with considerable advantage to advertisers who purchase space. However, the construction and manner of attachment of convenitonal signs of the character heretofore used has not made their application to automobiles which are driven both for pleasure and business a desirable practice. In most instances the signs are connected to the trunk lid by bolts which pass through apertures specially drilled therein and no effort is made to protect the original finish and condition of the automobile. Removable signs in which an attempt has been made to do away with the bolted connections have been proposed but have met with notable success, mainly for two reasons. First, they are relatively incapable of use on the widely varying body shapes of the different automobile manufacturers and, secondly they are unwieldly and bulky, making detachment a difficult problem. There also has been little success in preventing abrasion of the automobile finish by those portions of the assembly in direct contact with the vehicle.

The present invention represents a considerable improvement over existing signs in a number of respects. One of the primary objects of the invention is to provide a sign which, when desired, can be quickly and easily mounted on the trunk lid of an automobile or a similar vehicle and can be removed with equal ease and facility. The sign is particularly adapted to the needs of salesmen and other individuals who use their automobiles both for business and pleasure, since it can easily be removed from the automobile at times when it is not desired and can be remounted again without requiring any modification of, or damage to, the automobile.

One of the unique features of the invention lies in the provision of mounting means which is capable of adjustment to accommodate the sign to trunk lids of varying slope and configuration. The sign, by a simple adjustment, can be made to stand in the desired upright position on a wide variety of body types. One advantage of our invention resulting from the adjustability feature is that only one basic design is needed and consequently manufacturing and material costs can be held to a minimum.

Another important object of the invention is to provide a sign having the adjustability feature previously described and yet which is so constructed as to absolutely prevent any marring of the automobile finish when the sign is in place. In this connection an important feature of the invention lies in the use of non-metallic straps or belts as the means for securing the sign to the automobile and in the manner the belts are utilized to prevent contact of the metal parts of the sign with the body.

Still another object of the invention is to provide a novel and attractive sign which is particularly useful at nighttime. One of the salient features of the invention resides in the provision of a sign which is illuminated at times when the brake pedal is depressed. Not only is the attention of those in a position to see the sign drawn directly to it but also the drivers of following automobiles are alerted more emphatically of the intention to stop. Our invention, thus, serves not only a commercial purpose; it provides also a desirable adjunct to the conventional brake signal lights and is thus a safety aid.

A further object of the invention is to provide a sign which in construction is simple and can be manufactured at low cost. However, notwithstanding the simplicity of construction, signs embodying our invention are capable of bearing up under rugged use and will remain firmly in place under even the most severe conditions.

Other of further objects of the invention together with the features and novelty appurtenant thereto will appear in the course of the following description.

In the accompanying drawings which form a part of the specification and are to be read in connection therewith and in which like reference numerals indicate like parts in the various views:

Fig. 1 is a front elevational view of a preferred embodiment of a sign structure according to the invention;

Fig. 2 is an enlarged perspective view of the sign of Fig. 1 showing also a preferred form of mounting means, parts of the straps being broken away to indicate length and the straps being disposed in the approximate arc they would assume when mounted on a suitable automobile trunk lid;

Fig. 3 is a side elevation of the rear portion of a conventional automobile, part of the trunk area being in section and the sign being shown in section as viewed along the line 3—3 of Fig. 2 in the direction of the arrows; and Fig. 4 is an enlarged sectional view taken along the line 4—4 of Fig. 2.

Referring to the drawings, reference numeral 10 indicates generally a sign constructed according to our invention. The sign is mounted by means later to be described on the trunk lid 12a of a conventional automobile 12.

In its preferred form sign 10 comprises a hollow pan-like member of translucent material, preferably a plastic such as polystyrene. The side walls of the pan shaped member are indicated at 10a. Secured to the open back of the sign by screws 14 at the upper end and a U-shaped flange 16 at the lower end is a backing member 18. The upper sidewall of the sign is provided with an elongate recess bordered on three sides by an upstanding flange 20 integral with the side wall of the sign. Into this recess is fitted a plate-like member 22 formed of light transmitting material, for example, an acrylic resin such as "Lucite." The inner (or lower) edge of member 22 is exposed to the interior of the sign to receive light rays originating therein from an incadescent lamp bulb 24. Bulb 24 is fitted into a socket 26 secured to the interior of the sign by any suitable means. A conductor 28 is connected with socket 26 and extends outwardly through an aperture 18a provided in the backing member. The conductor is connected at its other end with the wiring 30 for the brake signal light 32 of the automobile.

The forward or exposed face of the sign, as illustrated in Fig. 1, is provided with any desired advertising symbols or legends. In the preferred embodiment, where the housing is translucent, the advertising can be pigmented a different color from the body of the sign and may be made translucent or opaque. In addition to the advertising media, the letters "STOP" are also incorporated in the sign, this preferably being pigmented red. The primary object is to obtain a clear and distinct outlining of the advertising media and the letters "STOP" when bulb 24 is energized by operation of the automobile brake mechanism.

Plate 22 on top of the sign is also provided with printed material rendered visible at night when bulb 24 is energized. Preferably, the printed material on plate 22 designates the name of the dealer in the goods advertised on the main body of the sign, although it will be evident that other information may be included as an alternative.

To provide a quickly and easily assembled means for mounting the sign on an automobile we have provided the following: Secured to the backing member 18 by screws 34 is a generally rectangular frame 36 preferably formed from wire rod. Near each corner, frame 36 is provided with U-shaped bends 36a which receive screws 34 and which are clamped between the heads of the screws and the backing member to hold the frame in place.

Provided respectively on the upper and lower cross bars of frame 36 are a pair of upper legs 38 and a pair of lower legs 40. Each of these is also preferably formed of wire rod. The lower legs 40 are generally U-shaped members welded at their ends directly to the frame and are provided with a reduced width at their outer ends, as indicated at 40a. The upper legs 38 are similar in shape to the lower legs but are considerably longer. Moreover, instead of being secured in fixed position with respect to the frame, the inner ends of the upper legs are bent around the frame in the form of eyes 38b to form a hinge connection. The upper legs 38 are thus swingable about the axis of the upper cross bar of frame 36 and accordingly are angularly adjustable with respect to backing member 18. The outer ends of legs 38, like those of the lower legs 40, are provided with a section of reduced width as indicated at 38a.

To secure the sign to the trunk lid 12a of the automobile, there are provided a pair of elongate belts or straps 42 which extend lengthwise of the trunk lid in spaced relation. These belts or straps are constructed of a non-metallic material such as woven fabric or other pliable material (for example, polyethylene) and are flexible. The opposite ends of straps 42 have affixed thereto hook members 44 for hooking over the edges of the trunk lid to hold the straps in place. The hook members 44 should be made as thin as possible—sheet metal has proved particularly suitable—and they should also be covered with a protective layer of non-metallic material (for example, felt) to prevent metal to metal contact. Buckles 46 are interposed in each strap (only one is illustrated) to permit adjustment of the length of the straps for various sizes and configurations of trunk lids.

Legs 38 and 40 are in each case connected with straps 42 by threading the strap through a ring member 48 then over the cross bar at the outer end of each leg and back through the ring 48 as is detailed in Fig. 4. It will be noted that the length of the ring, which in its preferred form is a rectangular member of bent wire rod, is less than the outside width of the portions 40a and 38a so that the ring cannot slip over and encircle the latter. The cross bar of each leg at its outer end is thus engaged within the loop 42a formed by the straps at that point and the legs are firmly anchored to the straps. It will also be noted that by threading the straps in the fashion described, both the legs and rings are prevented from coming into contact with the finish of the automobile, the non-metallic straps being the only parts of the assembly bearing against the trunk surface.

In mounting the sign on an automobile the trunk 12 is partially opened and hooks 44 are engaged with the edges. Being constructed of thin material the hooks will fit easily in the gap between the body of the automobile and the trunk lid and the lid may be closed without interference. The straps are then tightened by means of the buckles 46 so that the straps are drawn taut over the surface of the trunk lid. The tension in the straps prevents any slippage between the rings 48 and the straps and the legs will remain anchored firmly in the desired position.

Referring particularly to Fig. 3, it should be evident that by shifting the upper legs 38 lengthwise of straps 42—that is, changing the angular position of the legs 38 relative to backing member 18—the angle of the sign can be changed as desired. This adjustment is accomplished by loosening the straps and manipulating rings 48 and the loops 42a formed thereby until the legs are at the desired position. By the same token the entire sign can be shifted relative the straps by following the same procedure at the joinder of the lower legs 40 therewith.

The freedom of adjustment of the sign with respect to the strap makes possible the adaptation of the sign to automobiles of all makes and models even though the slopes and configurations of the trunk lids may vary widely from one to another. By the simple manipulation previously described the legs can be positioned and firmly anchored at any point lengthwise of the straps. The buckles 46 permit accommodation of the straps to trunks of different lengths and, being flexible, the straps follow exactly the trunk contour. It will thus be evident that the sign can be used on trunk lids which are substantially flat as well as on those having sharp breaks in contour similar to the one illustrated in the drawings.

From the foregoing it will be seen that the invention is well adapted to attain all of the ends and objects hereinbefore set forth and that it has other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the drawings is to be interpreted as illustrative and not in a limiting sense.

Having thus described our invention, we claim:

1. A sign for mounting on the trunk lid of a vehicle comprising a sign member, flexible nonmetallic strap members extending from front to rear on the exterior of the trunk lid, U-shaped support members on the sign member having their bight portions passing between said straps and said lid, and means cooperating with said straps in the vicinity of said bight portions to secure said bight portions to said straps and space said bight portions from the trunk lid to prevent contact therebetween, said means comprising ring members disposed adjacent said bight portions, the straps being threaded through said ring members on opposite sides of said bight portions to form U-shaped bends in the straps within which said bight portions are engaged.

2. A sign for mounting on the trunk lid of a vehicle comprising a sign member, flexible non-metallic strap members extending from front to rear on the exterior of the trunk lid, means for mounting said sign on said straps including angularly adjustable U-shaped members connected with said sign and having their bight portions lying between the straps and trunk lid, and means cooperating with said straps in the vicinity of said bight portions to secure the bight portions to the straps and to space said portions from the trunk lid and prevent contact therebetween, said means being adjustable lengthwise along the straps to change the angle of said angularly adjustable members with respect to said sign.

3. A sign as in claim 2 wherein said last mentioned means comprises ring members disposed adjacent said bight portions, the straps being threaded through said ring members on opposite sides of said bight portions to form U-shaped bends in the straps within which said bight portions are engaged.

References Cited in the file of this patent

UNITED STATES PATENTS

| | | |
|---|---|---|
| 1,534,223 | La Port | Apr. 21, 1925 |
| 1,885,282 | O'Connor | Nov. 1, 1932 |
| 1,942,444 | O'Connor | Jan. 9, 1934 |
| 2,078,183 | Ray | Apr. 20, 1937 |
| 2,109,565 | Coyne | Mar. 1, 1938 |
| 2,620,579 | Dienes | Dec. 9, 1952 |
| 2,675,983 | King | Apr. 20, 1954 |